United States Patent [19]

Nealy et al.

[11] Patent Number: 4,772,491
[45] Date of Patent: Sep. 20, 1988

[54] COATING PROCESS

[75] Inventors: David L. Nealy; Louis A. Wilkin; Fred D. Barlow, Jr., all of Kingsport, Tenn.

[73] Assignee: Eastman Kodak Company, Rochester, N.Y.

[21] Appl. No.: 84,773

[22] Filed: Aug. 13, 1987

[51] Int. Cl.$^4$ .............................................. B05D 3/04
[52] U.S. Cl. ................... 427/336; 427/385.5; 427/388.1; 427/389.7; 427/391; 427/393.5
[58] Field of Search ............... 427/336, 385.5, 388.1, 427/389.7, 391, 393.5

[56] References Cited

U.S. PATENT DOCUMENTS 3,607,813  9/1971  Purcell ............................ 260/29.6
4,072,644  2/1978  Hedrick ........................... 260/29.6

Primary Examiner—Bernard Pianalto
Attorney, Agent, or Firm—Thomas R. Savitsky; William P. Heath, Jr.

[57] ABSTRACT

Forming an aqueous printing ink or its semiaqueous or substantially nonaqueous concentrates exemplified as comprising a substantially homogeneous system of the components:

(1) from about 4 to about 90 weight % of one or more polyester materials having an acid component of from about 75 to about 84 mole % isophthalic acid and conversely from about 25 to about 16 mole % 5-sodiosulfoisophthalic acid, and having a glycol component of from about 45 to about 60 mole % diethylene glycol and conversely from about 55 to about 40 mole % 1,4-cyclohexanedimethanol or ethylene glycol or mixtures thereof;

(2) from none to about 70 weight % of pigment material;

(3) from about 0.01 to about 90 weight % of water; and (4) one or more acetylacetontes of the formula $M[CH(COCH_3)_2]_n$ wherein M is Al, Zr, Ni, Ca, V, or Fe, and n is the chemical valence of M, the weight ratio of polyester to total acetylacetonates being from about 10,000/1 to about 10/1.

5 Claims, No Drawings

COATING PROCESS

DESCRIPTION

1. Technical Field

This invention concerns pigmented and nonpigmented, aqueous inks and coatings and their nonaqueous or semiaqueous concentrates, containing certain insolubilizing agents and having greatly improved printing and coating properties such as flow-out, print smoothness, transparency, gloss, color development, and the like, wherein the pigment carrier or binder comprises water-dispersible polyester or polyesteramide material. The term "water-dispersible" includes water-dissipatable, water-soluble, aqueous suspension, colloidal dispersion or the like. The inks find special utility for letter press, intaglio, gravure, flexographic and other printing processes adaptable to the use of aqueous inks. The term "ink" is used herein in its broad sense as including the use thereof for coatings in all forms such as letters, patterns and coatings without design.

2. Background of the Invention

The printing industry in general finds many applications for the use of water-based inks and overprint varnishes as a means of meeting increasingly stringent solvent effluent regulations. Present day water-based inks often fail to satisfy these regulations as well as the necessary printability, stability, and performance properties required for commercial inks. For example, the various ethyleneacrylic acid copolymer salts of U.S. Pat. No. 3,607,813, the disclosure of which is incorporated herein by reference (for the printing process descriptions therein), in addition to requiring complex polymer and ink preparations, lack in performance on certain substrates. Other such aqueous or semiaqueous systems proposed for printing inks contain polymers such as styrene-butadiene or polyacrylate latex systems but these systems also have serious drawbacks including being non-water dispersible after short drying periods which complicates equipment clean up. Other water soluble or dispersible polymers suggested for printing ink use are discussed in U.S. Pat. No. 4,072,644.

In the commercial use of polymeric coatings such as paints, inks, and the like that are applied from water solution or dispersion, it is an economic advantage to have a material that is initially resoluble or redispersible in water even after it has dried to a film. This allows facile water clean-up of coating and printing equipment and other items such as mixing vessels and handling implements such as sampling cups and viscosity measurement instruments. However, it is also an advantage if the resulting coating can be converted in a short time to a highly water-resistant surface on the coated or printed product. These seemingly contradictory requirements are not well met by current commercial materials and post treatment techniques. The best results published to date involve pH change, i.e., evaporation of ammonia or similar base, to yield insoluble coatings, however, the pH adjustments can be a problem with a highly volatile base and odorous emissions and equipment corrosion often result.

It has now been discovered that far superior ink systems having these desirable properties can be prepared through the use of certain water-insoluble metal chelates which are sequestered at a pH of from about 6.0 to about 8.0 in water dispersions of the water-dispersible polymers, and which then behave as stable, "sequestered" hydrophobes as long as water is present. Evaporation of the water and subsequent holding and/or heating, usually as a part of the production drying, gives a highly water-resistant film which is essentially otherwise unchanged.

It is noted that the application of heat to a film of the ink, particularly to a film containing some water such as a freshly printed film, will enhance the insolubilizing action of the metal complexed acetylacetonates which enhancement is manifest in greater insolubilization. The heating is preferably at temperatures of from about 50° C. to about 100° C., for about 2.0 to about 40 seconds, and most preferably of from about 70° C. to about 90° C. for about 4.0 to about 10.0 seconds.

It is known that free multivalent cations will cause such water-resistance to develop in polymer films post-treated in separate, extrinsic operations with solutions containing multivalent cations (see defensive publication T-949001); however, stable, water-insoluble metal chelates would not be expected to be sequesterable in such a system to provide a highly convenient mechanism for insolubilization, much less give equivalent or superior water resistance upon drying.

The present invention, in addition to providing a unique ink system having an early redispersable phase which can be rendered essentially nondispersable, also provides marked improvements in the preparation, stability, and performance of water-based inks for printing and coating, particularly in regard to flow-out, color development and pick-up on the printing rollers and other machine elements.

DESCRIPTION OF THE INVENTION

The invention is defined as a composition useful as an ink or useful for the preparation of inks, comprising a substantially homogeneous system of the components:

(1) from about 4 to about 90 weight % of polymeric material of at least one linear water-dispersible polymer having carbonyloxy linking groups in the linear molecular structure wherein up to 80% of the linking groups may be carbonylamido linking groups, the polymer having an inherent viscosity of from about 0.1 to about 1.0, preferably from about 0.1 to about 0.5 measured in a 60/40 parts by weight solution of phenol/tetrachloroethane at 25° C., and at a concentration of 0.25 gram of polymer in 100 mL of the solvent, the polymer containing substantially equimolar proportions of acid equivalents (100 mole percent) to hydroxy and amino equivalents (100 mole percent), the polymer comprising the reaction products of (a), (b), (c), and (d) from the following reactants or ester forming or ester-amide forming derivatives thereof;

(a) at least one difunctional dicarboxylic acid;

(b) from about 4 to about 25 mole percent, based on a total of all acid, hydroxyl and amino equivalents being equal to 200 mole percent, of at least one difunctional sulfomonomer containing at least one metal cationic group attached to an aromatic or cycloaliphatic nucleus wherein the functional groups are hydroxy, carboxyl or amino;

(c) at least one difunctional reactant selected from a glycol or a mixture of a glycol and diamine having two —NRH groups, the glycol containing two —CH$_2$—OH groups of which (1) at least 15 mole percent based on the total mole percent of hydroxy or hydroxy and amino equivalents, is a poly(ethylene glycol) having the structural formula

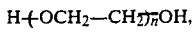

n being an integer of from 2 to about 20, or
(2) of which from about 0.1 to less than about 15 mole percent based on the total mole percent of hydroxy or hydroxy and amino equivalents, is a poly(ethylene glycol) having the structural formula

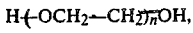

n being an integer of between 2 and about 500, preferably between 2 and about 200, and with the provision that the mole percent of said poly(ethylene glycol) within said range is inversely proportional to the quantity of n within said range; and
(d) from none to at least one difunctional reactant selected from a hydroxycarboxylic acid having one —C(R)$_2$—OH group, an aminocarboxylic acid having one —NRH group, and an amino-alcohol having one —C(R)$_2$—OH group and one —NRH group, or mixtures of said difunctional reactants; wherein each R in the (c) or (d) reactants is a H atom or an alkyl group of 1 to 4 carbon atoms;
(2) from none to about 70 weight % of pigment material;
(3) from about 0.01 to about 90 weight % of water; and
(4) one or more acetylacetonates of the formula M[CH—(COCH$_3$)$_2$]$_n$ wherein M is a polyvalent metal and n is the chemical valence of M, the weight ratio of water-dispersible polymer to total acetylacetonates being from about 10,000/1 to 10/1.

In the above polymeric material it is preferred that very minor, e.g., less than about 10 mole % based on all reactants, of reactant (d) is employed, that at least about 70 mole % of reactant (c) is glycol, and that at least about 70 mole % of all the hydroxy equivalents is present in the glycol.

The pigments useful in the present invention, in addition to those specifically identified below, include those described in NP1RI Raw Materials Data, Vol. 4, Pigments, Copyright 1983. Conventional dispersing aids, biocides, defoamers and the like may be used in the present inks if desired for their known effects.

In a preferred embodiment of the invention, the water-dispersible polymeric material comprises (a) an acid component (moiety) of from about 75 to about 84 mole % isophthalic acid and conversely from about 25 to about 16 mole % 5-sodiosulfoisophthalic acid, and (b) a glycol component (moiety) of from about 45 to about 60 mole % diethylene glycol and conversely from about 55 to about 40 mole % 1,4-cyclohexanedimethanol or ethylene glycol or mixtures thereof, and wherein the weight ratio of pigment material to said polymeric material is from about 1/10 to about 2/1. With regard to this polymeric material, the term "moiety" as used herein designates the residual portion of the reactant acid or glycol which actually enters into or onto the polymer chain during the condensation or polycondensation reaction.

Further preferred embodiments of the invention are as follows:
(a) the inherent viscosity of the water-dispersible polymeric material is from about 0.28 to about 0.38, the said acid component (moiety) comprises from about 80 to about 83 mole % isophthalic acid and conversely from about 20 to about 17 mole % 5-sodiosulfoisophthalic acid, and the said glycol component (moiety) comprises from about 52 to about 56 mole % diethylene glycol and conversely from about 48 to about 44 mole % 1,4-cyclohexanedimethanol;
(b) the pigment is one or a mixture of the following color index materials according to their generic names: C.I. Pigment Yellow 17; C.I. Pigment Blue 27; C.I. Pigment Red 49:2; C.I. Pigment Red 81:1; C.I. Pigment Red 81:3; C.I. Pigment Red 81:x; C.I. Pigment Yellow 83; C.I. Pigment Red 57:1; C.I. Pigment Red 49:1; C.I. Pigment Violet 23; C.I. Pigment Green 7; C.I. Pigment Blue 61; C.I. Pigment Red 48:1; C.I. Pigment Red 52:1; C.I. Pigment Violet 1; C.I. Pigment White 6; C.I. Pigment Blue 15; C.I. Pigment Yellow 12; C.I. Pigment Blue 56; C.I. Pigment Orange 5; C.I. Pigment Black 7; C.I. Pigment Yellow 14; C.I. Pigment Red 48:2; and C.I. Pigment Blue 15:3;
(c) the aqueous ink is coated or printed onto a substrate selected from metal foil, clay coated paper, glass, calendered paper, stainless paper, and films or other substrates of polyester, polycarbonate, cellulose ester, regenerated cellulose, poly(vinylidene chloride), polyamide, polyolefin, or polystyrene;
(d) the insolubilizing material is Al[CH—(COCH$_3$)$_2$]$_3$;
(e) the weight ratio of polyester to AcAc is from about 2,000/1 to about 50/1; and
(f) a preferred group of metals wherein M is Al, Zr, Ni, Ca, V or Fe.

The complete chemical definitions of the above C.I. pigments are given in the following table:

| Pigments | |
|---|---|
| Generic Name | C.A. Index/Chemical Name |
| C.I. Pigment Yellow 17 | Butanamide, 2,2'-[(3,3'-dichloro[1,1'-biphenyl]4,4'-diyl)bis(azo)bis[N—(2-methoxyphenyl)-3-oxo- |
| C.I. Pigment Blue 27 | Ferrate (4-1), hexakis (cyano-C)-ammonium iron (3+)(1:1:1) |
| C.I. Pigment Red 49:2 | 1-Naphthalenesulfonic acid, 2-[(2-hydroxy-1-naphthalenyl)azo]-, calcium salt (2:1) |
| C.I. Pigment Red 81:1 | Benzoic acid, 2,-[6-ethylamino)-3-(ethylimino)-2,7-dimethyl-3H—xanthen-9-yl]-, ethyl ester, w/molybdenum tungsten hydroxide oxide phosphate |
| C.I. Pigment Red 81:3 | Benzoic acid, 2-[6-ethylamino)-3-ethylimino)-2,7-dimethyl-3H—xanthen-9-yl]-, ethyl ester, molybdatesilicate |
| C.I. Pigment Red 81:x | Benzoic acid, 2-[6-(ethylamino)-3-(ethylimino)-2,7-dimethyl-3H—xanthen-9-yl]-, ethyl ester, molybdatephosphate |
| C.I. Pigment Yellow 83 | Butanamide, 2,2'-[(3,3'-dichloro[1,1'-biphenyl]-4,4'-diyl)bis(azo)bis[N—(4-chloro-2,5-dimethoxyphenyl)-3-oxo- |
| C.I. Pigment Red 57:1 | 2-Naphthalenecarboxylic acid, 3-hydroxy-4-[(4- |

-continued

| Pigments | |
|---|---|
| Generic Name | C.A. Index/Chemical Name |
| | methyl-2-sulfophenyl)azo]-, calcium salt (1:1) |
| C.I. Pigment Red 49:1 | 1-Naphthalenesulfonic acid, 2-[(2-hydroxy-1-naphthalenyl)azo]-, barium salt (2:1) |
| C.I. Pigment Violet 23 | Diindolo[3,3',2'm] triphenodioxazine, 8,18-dichloro-5,15-diethyl-5,15-dihydro- |
| C.I. Pigment Green 7 | C.I. Pigment Green 7 |
| C.I. Pigment Blue 61 | Benzenesulfonic acid, [[4-[[4-phenylamino)phenyl]-[4-(phenylimino)-2,5-cyclo-hexadien-1-ylidene]methyl]-phenyl]amino]- |
| C.I. Pigment Red 48:1 | 2-Naphthalenecarboxylic acid, 4-[(5-chloro-4-methyl-2-sulfophenyl)azo]-3-hydroxy-, barium salt (1:1) |
| C.I. Pigment Red 52:1 | 2-Naphthalenecarboxylic acid, 4-[(4-chloro-5-methyl-2-sulfophenyl)azo]-3-hydroxy-, calcium salt (1:1) |
| C.I. Pigment Violet 1 | Ethanaminium, N—[9-(2-carboxyphenyl)-6-(diethyl-amino)-3H—xanthen-3-ylidene]-N—ethyl-, molyb-datetungstatephosphate |
| C.I. Pigment White 6 | Titanium oxide ($TiO_2$) |
| C.I. Pigment Blue 15 | Copper, [29H, 31H—phthalocyaninato (2-)-$N^{29}$, $N^{30}$, $N^{31}$, $N^{32}$]-, (Sp-4-1)- |
| C.I. Pigment Yellow 12 | Butanamide, 2,2'-[(3,3'-dichloro[1,1'-biphenyl]-4,4'-diyl)bis(azo)]bis[3-oxo-N—phenyl- |
| C.I. Pigment Blue 56 | Benzenesulfonic acid, 2-methyl-4-[[4-[[4-[(3-methylphenyl)amino]phenyl]-[4-[(3-methylphenyl)-imino]-2,5-cyclohexa-dien-1-ylidene]methyl]-phenyl]amino]- |
| C.I. Pigment Orange 5 | 2-Naphthalenol, 1-[(2,4-dinitrophenyl)azo]- |
| C.I. Pigment Black 7 | Carbon black |
| C.I. Pigment Yellow 14 | Butanamide, 2,2'-[(3,3'-dichloro[1,1'-biphenyl]-4,4'-diyl)bis(azo)]bis-[N—(2-methylphenyl)-3-oxo- |
| C.I. Pigment Red 48:2 | 2-Naphthalenecarboxylic acid, 4-[(5-chloro-4-methyl-2-sulfophenyl)-azo]-3-hydroxy-, calcium salt (1:1) |
| C.I. Pigment Blue 15:3 | Copper, [29H, 31H—phthalocyaninato (2-)-$N^{29}$, $N^{30}$, $N^{31}$, $N^{32}$]-, (SP-4-1)- |

The inherent viscosities (I.V.) of the particular polyester materials useful herein range from about 0.1 to about 1.0 determined according to ASTM D2857-70 procedure, in a Wagner Viscometer of Lab Glass, Inc. of Vineland, N.J., having a ½ mL capillary bulb, using a polymer concentration about 0.25% by weight in 60/40 by weight of phenol/tetrachlorethane. The procedure is carried out by heating the polymer/solvent system at 120° C. for 15 minutes, cooling the solution to 25° C. and measuring the time of flow at 25° C. The I.V. is calculated from the equation $$(n)\ 25°\ C. = \frac{\ln \frac{t_s}{t_0}}{C}\ 0.50\%$$

where:
(n) = inherent viscosity at 25° C. at a polymer concentration of 0.25 g/100 mL of solvent;
ln = natural logarithm;
$t_s$ = sample flow time;
$t_0$ = solvent-blank flow time; and
C = concentration of polymer in grams per 100 mL of solvent = 0.25.

The units of the inherent viscosity throughout this application are in deciliters/gram. It is noted that higher concentrations of polymer, e.g., 0.50 g of polymer/100 mL solvent may be employed for more precise I.V. determinations.

In general, the water-dispersible polyester materials useful in the present invention are excellent film formers for water based printing inks. The polymers form stable dispersions in water and produce tough, flexible films on drying. Films will form at temperatures down to just above the freezing point of water. The polymers in dispersion form may be plasticized if necessary, for example, with certain water immiscible phthalate esters to high degrees of flexibility. Printing inks prepared from the present concentrates are readily further water reducible (dilution) and the finished or press-ready inks typically comprise in % by weight, from about 30 to about 90% water, preferably from about 40 to about 70%, from about 4 to about 40% water-dispersible polymer, preferably from about 10 to about 30%, and from about 0 to about 25% pigment, preferably from about 3 to about 20%. Various types of modifiers may be used such as up to about 15.0% by weight of polyvinyl alcohol or the like. The inks dry rapidly upon printing, wet surfaces exceptionally well and have excellent adhesion to many plastic films and metal foil as well as to paper, glass, polyethylene and many other substrates. Both the 100% solids, water-dispersible polymers and the corresponding aqueous dispersions thereof may be pigmented by conventional techniques, for example, prior to the addition of the AcAc. The use of at least substantially deionized water in the present invention is preferred in order to prevent premature ion exchange.

The aforedescribed polyester material is prepared according to the polyester preparation technology described in U.S. Pat. Nos. 3,734,874; 3,779,993; and 4,233,196, the disclosures of which are incorporated herein by reference, and the use of the term "acid" in the above description and in the appended claims includes the various ester forming or condensable derivatives of the acid reactants such as the dimethyl esters thereof as employed in the preparations set out in these patents. Among the preferred sulfo-monomers are those wherein the sulfonate group is attached to an aromatic nucleus such as benzene, naphthalene, diphenyl, or the like, or wherein the nucleus is cycloaliphatic such as in 1,4-cyclohexanedicarboxylic acid.

Dispersal of the present polyester material in water may be done, for example, at preheated water temperature of about a 180° to about 200° F. and the polymer added as pellets to the vortex under high shear stirring. A Cowles Dissolver, Waring Blender, or similar equipment may be used. Once water is heated to temperature, additional heat input is not required. Depending upon the volume prepared, dispersal of the pellets by stirring should be complete within 15 to 30 minutes. Continued agitation with cooling may be desirable to prevent thickening at the surface due to water evaporation. Viscosities of the dispersions remain low up to nonvolatile levels of about 25-30%, but generally increase sharply above these levels. Viscosities of the dispersions will be influenced by the degree of polymer dispersion (fineness) obtained which is affected by the dispersing temperature, shear, and time.

The present concentrates and inks may also be prepared by milling, e.g., two-roll milling the finely comminuted, nonpolymer soluble pigment and insolubilizing agent into the solid polyester material, and for the aqueous inks and semiaqueous concentrates, thereafter dispersing the milled material in water in a manner generally similar to the procedure described in U.S. Pat. No. 4,148,779 for solubilizing organic disperse textile dyes in polyester for subsequent dispersal in water. Dispersions can also be made by adding the pigment at high speed agitation to the polyester material previously dispersed in water and then grinding in a ball mill or sand mill to further reduce pigment size. The presence of the insolubilizing agent during this operation is preferred. The preferred pH of the present inks is from about 5.0 to about 7.5.

The viscosities of the inks may, of course, range widely, e.g., from about 15 to about 60 seconds as measured in a #2 Zahn cup according to ASTM D-4212-82. The higher viscosities, e.g. from about 22 to about 60 seconds and lower water levels, e.g. from about 10 to about 30% represent semiaqueous concentrated forms of the present inks. In this regard, in order to reduce the viscosities of these inks when necessary for certain printing apparatus and processes varying amounts of water are added. In this water addition, the ink viscosity may be reduced, for example, up to about 60% or more of its original concentrate value, and the press-ready ink viscosity preferably ranges between about 15 and 30 seconds in a number 2 Zahn cup.

The following examples will further illustrate practice of the invention.

EXAMPLE 1

Polyester Preparation

A mixture of 79.5 g (0.41 mole) of dimethyl isophthalate, 26.6 g (0.09 mole) of dimethyl-5-sodiosulfoisophthalate, 54.1 g (0.51 mole) of diethylene glycol, 37.4 g (0.26 mole) of 1,4-cyclohexanedimethanol, 1.4 mL of a 1.0% (based on Ti) catalyst solution of titanium tetraisopropoxide, and 0.74 g (0.009 mole) of sodium acetate buffer is stirred and heated for two hours at 200°–220° C. The temperature is then raised to 275° C. and a vacuum of 0.3 mm is applied. Heating and stirring is continued for 1 hour under these conditions. After cooling, the polymer obtained has an I.V. of 0.36 and is tough and rubbery and is dissipatable in hot water to the extent of about 25 weight percent to give a clear, slightly viscous solution. The composition of the acid moieties of this polyester material is analyzed to be 82 mole % isophthalic acid residue and 18 mole % 5-sodiosulfoisophthalic acid residue, and of the glycol moieties is analyzed to be 54 mole % diethylene glycol and 46 mole % 1,4-cyclohexanedimethanol.

EXAMPLE 2

Polyesters designated (A), (B), (C) and (D) were prepared essentially in accordance with Example 1 of the aforementioned U.S. Pat. No. 4,233,196 from the following materials:

| (A) | g. moles |
|---|---|
| Dimethyl Isophthalate (IPA) | 0.415 |
| Dimethyl-5-Sodiosulfoisophthalate (SIP) | 0.085 |
| 1,4-Cyclohexanedimethanol (CHDM) | 0.520 |
| Carbowax 1000 (CW 1000) | 0.0273 |
| Sodium Acetate | 0.0085 |
| Irganox 1010 | 0.1 wt. % |

The Carbowax 1000 has the structure

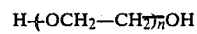

wherein n is about 22. The polymer analyzed by NMR contains (in reacted form) about 83 mole % IPA, about 17 mole % SIP, about 94.5 mole % CHDM, and about 5.5 mole % of CW 1000, and has an I.V. of about 0.39.

| (B) | g. moles |
|---|---|
| Dimethyl Isophthalate | 0.328 |
| Dimethyl-5-Sodiosulfoisophthalate | 0.072 |
| 1,4-Cyclohexanedimethanol | 0.442 |
| Carbowax 400 (n = 10) | 0.058 |
| Sodium Acetate | 0.0072 |

The polymer as analyzed by NMR contains (in reacted form) about 82 mole % IRA, about 18 mole % SIP, about 85.5 mole % CHDM and about 14.5 mole % CW 400, and has an I.V. of about 0.46.

| (C) | g. moles |
|---|---|
| Dimethyl Isophthalate | 0.41 |
| Dimethyl-5-Sodiosulfoisophthalate | 0.09 |
| 1,4-Cyclohexanedimethanol | 0.55 |
| Carbowax 400 (n = 90) | 0.0005 |
| Sodium Acetate | 0.009 |

The polymer as analyzed by NMR contains (in reacted form) about 82 mole % IPA, about 18 mole % SIP, about 99.9 mole % CHDM and about 0.1 mole % CW 4000, and has an I.V. of about 0.16.

| (D) | g. moles |
|---|---|
| Dimethyl Isophthalate | 0.205 |
| Dimethyl-5-Sodiosulfoisophthalate | 0.045 |
| Ethylene Glycol (EG) | 0.9638 |
| Carbowax 2000 (n = 45) | 0.03625 |
| Sodium Acetate | 0.0045 |

The polymer as analyzed by NMR contains (in reacted form) about 82 mole % IPA, about 18 mole % SIP, about 85.5 mole % EG, and about 14.5 mole % CW 2000, and has an I.V. of about 0.34.

In these polymers containing the Carbowax material, the n value is preferably between about 6 and 150.

The present insolubilizing agents may be sequestered in the polymeric material by various means. A preferred method is to employ a volatile solvent for the agent as described in the following example.

EXAMPLE 3

To 10 mL of an aqueous dispersion of the polyester of Example 1 (3.08 g. of polymer in 6.92 mL of water) is added 0.51 gm of Al(acetylacetonate)$_3$ in 2 mL of $CH_2Cl_2$ and 2 mL of water. The mixture is heated while distilling away the $CH_2Cl_2$ and the final pot temperature is 95°–96° C. The resulting slurry is cooled and filtered to give a stable aqueous dispersion to which pigments or other additives can be blended.

The acetylacetonates can also be added by stirring directly into the inks as shown in Example 4b below, and it is preferable to make the addition as a solution of the acetylacetonate in a suitable solvent which does not adversely affect the ink or its coatability.

In accordance with the present invention, inks prepared from polyester material such as given in the above examples, and including the present insolubilizing agents and polymer insoluble pigments, with or without various property modifiers such as polyvinyl alcohol. Pluronics ® or the like have been found to be unexpectedly superior over prior aqueous inks with respect to one or more of such properties as flow-out or printability, final water resistance of the film, pigment wetting, pigment stability, temperature stability (heat and freeze-thaw), nonsettling for extended periods of time, nonpolluting with respect to odor and volatile organics, nonflocculating, wide viscosity range inks, adhesion to a variety of substrates, hardness, gloss, drying rate on substrates, resistance to grease, water and scuff, compatibility with other water-based inks, wet rub resistance, ink mileage characteristics (considerable water dilution allowable at the press), ink press stability in general, printability (clean, sharp transfer without "stringing or misting"), trapping, easy clean up, non-plugging of printing plates, flexibility, redispersibility or rewetting, crinkle resistance, high pigment loading, solvent resistance, alkali, chemical and detergent resistance, blocking resistance, lightfastness, toughness, substrate wetting, hold-out, dry-rate, and no offset on the printing press (coating, e.g., on tension rollers).

EXAMPLE 4a

| Ink (A) | Approximate % by Weight |
| --- | --- |
| Deionized Water | 58.8 |
| Polymer of Example 1 | 19.2 |
| Raven 1020, Pigment | 12.0 |
| n-Propanol | 10.0 |

The solid polymer (32 parts) is dispersed in approximately 68 parts of deionized water at 85° C. to 95° C. and 0.2 parts of biocide added. To 75 parts of this dispersion is added 10 parts of deionized water and 15 parts of the carbon black at high speed agitation for five minutes on a Waring Blender. The mixture is then milled in an Eiger mill operated at about 5,000 rpm for about 7.5 minutes to further reduce the pigment for a grind of, for example, from about "2" to above about "0" NPIRI grind gauge. The resulting composition has a pH of about 5.6 and a viscosity of 26–29 seconds on a #2 Zahn cup determined according to ASTM D-4212-82. To 90 parts by weight of this composition is added 10 parts by weight of n-propanol with stirring. This procedure yields an aqueous-alcohol ink (A) which is nonsettling for extended periods, does not flocculate or agglomerate, and can be reduced in viscosity with deionized water. The ink dries rapidly upon printing, has virtually no odor and can be readily cleaned from printing equipment with warm deionized water. Tenacious, dried films of this ink can be cleaned from printing equipment with small amounts of detergents (5–10%) added to warm (80°–90° F.) deionized water. Such properties are also obtained using other pigments such as those disclosed above.

EXAMPLE 4b

Ink (B)

To 5.0 gm of ink (A) is added with stirring, 0.2 gm of 2.0% by weight Al(acetylacetonate)$_3$ in n-propanol. This procedure yields an aqueous-alcohol ink (B) essentially similar to ink (A) above and which is also nonsettling for extended periods, does not flocculate or agglomerate, can be reduced in viscosity with deionized water, dries rapidly upon printing, has virtually no odor, and can be readily cleaned from printing equipment with warm deionized water. Proofs of this ink are prepared with a flexographic hand proofer employing a 180-line anilox roll on aluminum foil, Mylar film, corona discharge treated polyethylene coated paperboard and corona discharge treated polyethylene film with excellent adhesion and printability results.

At this point, the differences in the two inks, (A) and (B), become manifest. Whereas tenacious, dried films of ink (A) can be cleaned from printing equipment with small amounts of detergents (5–10%) added to warm (80°–90° F.) deionized water, dried films of ink (B) especially those which have been aged, exhibit greater resistance to water redispersibility through the operation of the acetylacetonates.

The point of drying of the present ink films beyond which water redispersibility becomes impractical is at water contents of the ink film of less than about 0.1%, preferably less than about 0.01% by weight of water based on total ink film weight. At lower water concentrations the solubilizing capacity of the cationic sulfo groups is essentially lost, presumably through ion exchange with the acetylacetonate multivalent cation.

The sequestering and insolubilizing phenomena observed above is typical for all of the water-dispersible polymeric materials generally disclosed herein and specifically disclosed in the examples, and it must be noted that as in all such complex systems, variations in the effect of the present invention on different ink systems coming within the broad definitions herein, must be expected.

The weight percentages of the polyester, water, cosolvent, and pigment will of course vary depending on whether it is desired to produce a substantially dry concentrate, an intermediate aqueous concentrate, or a finished, press-ready, aqueous ink, all of which contain the acetylacetonates. Typical approximate ranges, Broad (1), Preferred (2), and Most Preferred (3), of these percentages (dry wt. %) are given in the following table.

| | Finished Ink | | | Intermediate Aqueous Concentrate | | | Substantially Dry Concentrate | | |
| --- | --- | --- | --- | --- | --- | --- | --- | --- | --- |
| | 1 | 2 | 3 | 1 | 2 | 3 | 1 | 2 | 3 |
| Polyester | 4— | 10— | 15— | 23— | 40— | 49— | 90.0— | 34.0— | 47.0— |

-continued

|  | Finished Ink | | | Intermediate Aqueous Concentrate | | | Substantially Dry Concentrate | | |
| --- | --- | --- | --- | --- | --- | --- | --- | --- | --- |
|  | 1 | 2 | 3 | 1 | 2 | 3 | 1 | 2 | 3 |
| $H_2O$ | 40–90 | 30–40–70 | 25–50–65 | 90–10–30 | 80–15–25 | 72–18–23 | 99.9 0.01–10 | 94.6 0.4–6.0 | 89.0 1.0–3.0 |
| Cosolvent | 0–15 | 0–10 | 2–7 | 0–7 | 0–5 | 0–3 | <0.01 | <0.01 | <0.01 |
| Pigment | 0–25 | 3–20 | 5–15 | 0–40 | 5–30 | 10–25 | 0–70 | 5–60 | 10–50 |

In these compositions, the concentrations of the acetylacetonates (AcAc) are expressed in terms of the weight ratios of polyester/AcAc and range broadly from about 10,000/1 to about 10/1, preferably from about 2,000/1 to about 50/1, and most preferably from about 1,500/1 to about 200/1.

The invention has been described in detail with particular reference to preferred embodiments thereof, but it will be understood that variations and modifications can be effected within the spirit and scope of the invention.

We claim:

1. A coating process wherein the coating material has an initial water redispersible phase and a final water-nondispersible phase, comprising the steps of
(1) forming a stable, homogeneous, aqueous system containing the components (A) and (B), wherein
    (A) comprises one or more polymeric materials selected from at least one linear, water-dispersible polymer having carbonyloxy linking groups in the linear molecular structure wherein up to 80% of the linking groups may be carbonylamido linking groups, the polymer having an inherent viscosity of from about 0.1 to about 1.0 measured in a 60/40 parts by weight solution of phenol/tetrachloroethane at 25° C. and at a concentration of 0.25 gram of polymer in 100 mL of the solvent, the polymer containing substantially equimolar proportions of acid equivalents (100 mole percent) to hydroxy and amino equivalents (100 mole percent), the polymer comprising the reaction products of (a), (b), (c) and (d) from the following reactants or ester forming or esteramide forming derivatives thereof;
        (a) at least one difunctional dicarboxylic acid;
        (b) from about 4 to about 25 mole percent, based on a total of all acid, hydroxyl and amino equivalents being equal to 200 mole percent, of at least one difunctional sulfomonomer containing at least one cationic sulfonate group attached to an aromatic or cycloaliphatic nucleus wherein the functional groups are hydroxy, carboxyl or amino;
        (c) at least one difunctional reactant selected from a glycol or a mixture of a glycol and diamine having two —NRH groups, the glycol containing two —CH$_2$—OH groups of which
            (1) at least 15 mole percent based on the total mole percent of hydroxy or hydroxy and amino equivalents, is a poly(ethylene glycol) having the structural formula

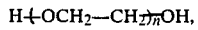

n being an integer of from 2 to about 20, or
            (2) of which from about 0.1 to less than about 15 mole percent based on the total mole percent of hydroxy or hydroxy and amino equivalents, is a poly(ethylene glycol) having the structural formula

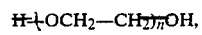

n being an integer of between 2 and about 500, and with the proviso that the mole percent of said poly(ethylene glycol) within said range is inversely proportional to the quantity of n within said range; and
        (d) from none to at least one difunctional reactant selected from a hydroxycarboxylic acid having one —C(R)$_2$—OH group, an aminocarboxylic acid having one —NRH group, and an aminoalcohol having one —C(R)$_2$—OH group and one —NRH group, or mixtures of said difunctional reactants; wherein each R in the (c) or (d) reactants is a H atom or an alkyl group of 1 to 4 carbon atoms; and
    (B) comprises one or more metal acetylacetonates of the formula M[CH—(COCH$_3$)$_2$]$_n$ wherein M is Al, Zr, Ni, Ca, Zn, V, or Fe, and n is the chemical valence of M, wherein the weight ratio of polyester to total acetylacetonates is from about 10,000/1 to about 10/1;
(2) applying said aqueous system to a substrate to form a coating thereon,
(3) drying said coating for an initial period during which said coating is redispersible in water, and
(4) either redispersing said dried coating in water during said initial period or thereafter subjecting said coating to drying conditions which render said coating nondispersible in water.

2. The process of claim 1 wherein said aqueous system also contains one or more dyes or pigments or mixtures thereof.

3. The process of claim 1 wherein component (A) comprises one or more polymeric materials selected from polyester materials having an inherent viscosity of from about 0.28 to about 0.38, an acid moiety of from about 75 to about 84 mole % isophthalic acid and conversely from about 25 to about 16 mole % 5-sodiosulfoisophthalic acid, and a glycol moiety of from about 45 to about 60 mole % diethylene glycol and conversely from about 55 to about 44 mole % 1,4-cyclohexanedimethanol or ethylene glycol or mixtures thereof, and wherein the metal M of component (B) is either or both of Al and Zr.

4. The process of claim 1 wherein the coating contains greater than about 0.1% by weight of water throughout said initial drying period.

5. The process of claim 1 wherein the coating contains greater than about 0.01% by weight of water throughout said initial drying period.

* * * * *